United States Patent
Zhang et al.

(10) Patent No.: US 11,513,578 B1
(45) Date of Patent: Nov. 29, 2022

(54) POWER MANAGEMENT SYSTEM FOR AN ARTIFICIAL REALITY SYSTEM

(71) Applicant: Meta Platforms Technologies, LLC, Menlo Park, CA (US)

(72) Inventors: Rui Zhang, Sunnyvale, CA (US); Yuming Liu, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 360 days.

(21) Appl. No.: 16/832,920

(22) Filed: Mar. 27, 2020

Related U.S. Application Data (60) Provisional application No. 62/969,313, filed on Feb. 3, 2020.

(51) Int. Cl.
*G06F 1/3206* (2019.01)
*G02B 27/01* (2006.01)
*H02M 7/483* (2007.01)

(52) U.S. Cl.
CPC ....... *G06F 1/3206* (2013.01); *G02B 27/0172* (2013.01); *H02M 7/483* (2013.01)

(58) Field of Classification Search
CPC ...... H02J 7/007; H02M 3/33561; H02M 7/23; H02M 3/1582; H02M 3/33507; H02M 3/156; H02M 1/007; H02M 3/00; H02M 1/325; B60L 58/20; B60L 3/003; B60L 2210/14; B60L 2210/12; Y02T 10/72; Y02T 10/70
See application file for complete search history.

(56) References Cited

U.S. PATENT DOCUMENTS

| | | | |
|---|---|---|---|
| 9,660,539 B2 * | 5/2017 | Ren ................. | H02M 3/33507 |
| 2003/0231170 A1 * | 12/2003 | Yoshikawa ............ | G06F 3/016 |
| | | | 345/173 |
| 2004/0119449 A1 * | 6/2004 | Matley ............... | H02M 7/4807 |
| | | | 323/234 |
| 2004/0174149 A1 * | 9/2004 | Agari ..................... | G05F 1/565 |
| | | | 323/271 |
| 2006/0193153 A1 * | 8/2006 | Erdl ................. | H02M 3/33592 |
| | | | 363/16 |
| 2006/0214647 A1 * | 9/2006 | Ishimaru ............ | H02M 3/1588 |
| | | | 323/222 |
| 2008/0129117 A1 * | 6/2008 | Kobayashi ............... | H02J 7/34 |
| | | | 320/101 |
| 2010/0133912 A1 * | 6/2010 | King .................. | H02M 3/1582 |
| | | | 307/82 |
| 2011/0075454 A1 * | 3/2011 | Jones ..................... | H02M 3/22 |
| | | | 363/67 |
| 2011/0090186 A1 * | 4/2011 | Yamazaki .......... | H01L 27/1225 |
| | | | 345/204 |

(Continued)

*Primary Examiner* — William Lu
(74) *Attorney, Agent, or Firm* — Fenwick & West LLP (57) ABSTRACT

A power management system for a headset includes a step-up converter and a step-down converter. The step-up converter increases the voltage and decreases the current supplied by the power supply. The power is transmitted via transmission lines at the increased voltage. The step-down converter decreases the voltage to a suitable level for various components of a power rail assembly. The power lost in the transmission lines is proportional to the square of the current. The power saved by transmission at a lower current in the transmission lines is greater than the power lost by the step-up converter and the step-down converter.

18 Claims, 4 Drawing Sheets

(56) References Cited

U.S. PATENT DOCUMENTS

| | | | |
|---|---|---|---|
| 2012/0223650 A1* | 9/2012 | Radermacher | H05B 47/18 315/307 |
| 2013/0258270 A1* | 10/2013 | Cazalet | G02C 5/008 351/158 |
| 2013/0285470 A1* | 10/2013 | Koyama | H02M 7/217 307/112 |
| 2014/0097747 A1* | 4/2014 | Bader | H01J 25/025 307/77 |
| 2014/0176076 A1* | 6/2014 | Momo | H01M 10/4242 320/128 |
| 2014/0347005 A1* | 11/2014 | Zhou | H02J 7/007 320/137 |
| 2015/0249385 A1* | 9/2015 | Takahashi | H02M 3/156 315/291 |
| 2015/0357834 A1* | 12/2015 | McLean | H02M 3/04 307/31 |
| 2016/0043715 A1* | 2/2016 | Kurokawa | H03K 17/687 327/434 |
| 2016/0094214 A1* | 3/2016 | Liu | H03K 17/005 327/113 |
| 2016/0131913 A1* | 5/2016 | Kim | G02C 5/20 359/630 |
| 2016/0148538 A1* | 5/2016 | Al-Busaidi | G09B 21/003 434/114 |
| 2017/0005683 A1* | 1/2017 | Yang | H04B 1/3888 |
| 2017/0201170 A1* | 7/2017 | Abu-Hajar | H02M 7/48 |
| 2018/0109181 A1* | 4/2018 | King | H02M 3/07 |
| 2018/0166903 A1* | 6/2018 | Sato | H02J 7/02 |
| 2018/0219986 A1* | 8/2018 | Lee | H04B 5/0037 |
| 2019/0006076 A1* | 1/2019 | Yazaki | H01F 37/00 |
| 2019/0097543 A1* | 3/2019 | Achtzehn | H02M 3/33584 |
| 2019/0173393 A1* | 6/2019 | Chivite Zabalza | H02M 1/34 |
| 2019/0204954 A1* | 7/2019 | Kim | H01L 27/3255 |
| 2020/0012112 A1* | 1/2020 | Yang | G06F 1/163 |
| 2020/0044565 A1* | 2/2020 | Suzuki | H02M 7/48 |
| 2020/0366205 A1* | 11/2020 | Alves | B60L 58/20 |
| 2021/0125542 A1* | 4/2021 | Liu | H02M 1/007 |
| 2021/0265648 A1* | 8/2021 | Tano | H01M 8/04201 |

\* cited by examiner

Detect power load in a headset.
310

Transmit power from a power supply to a step-up converter.
320

Increase a voltage of the power using the step-up converter.
330

Transmit the power from the step-up converter to a step-down converter.
340

Decrease the voltage using the step-down converter.
350

Transmit the power to a power rail assembly of a headset.
360

POWER MANAGEMENT SYSTEM FOR AN ARTIFICIAL REALITY SYSTEM

CROSS REFERENCE TO RELATED APPLICATIONS

This application claims the benefit of U.S. Provisional Application No. 62/969,313, filed Feb. 3, 2020, which is incorporated by reference in its entirety.

FIELD OF THE INVENTION

This disclosure relates generally to artificial reality systems, and more specifically to power systems for artificial reality systems.

BACKGROUND

Headsets, such as artificial reality headsets, include power systems that supply power to various components on the headset. Typically, many of the components, as well as the power system, are located near a front portion of the headset. However, the power supply often constitutes a significant portion of the weight of the complete headset. In headsets where the weight of the components and the power supply are concentrated near the front of the headset, the weight may result in an uncomfortable and/or poorly fitting headset.

SUMMARY

A power management system for a headset includes a power supply located at a rear portion of the headset. The power management system includes a step-up converter and a step-down converter. The step-up converter increases the voltage and decreases the current supplied by the power supply. The power is transmitted via transmission lines at the increased voltage. The step-down converter decreases the voltage to a suitable level for various components of a power rail assembly. The power lost in the transmission lines is proportional to the square of the current. The power saved by transmission at a lower current in the transmission lines is greater than the power lost by the step-up converter and the step-down converter.

In some embodiments, a power system includes a power supply configured to output a first direct current (DC) voltage. The power supply is located at a first portion of a headset. A step-up converter is electrically coupled to the power supply, and the step-up converter is configured to increase the first DC voltage to a second DC voltage. A step-down converter is located at a second portion of the headset and electrically coupled to the step-up converter. The step-down converter is configured to reduce the second DC voltage to a third DC voltage. At least a portion of the third DC voltage is provided to an electrical load of the headset.

In some embodiments, a headset comprises a power supply, a step-up converter, and a step-down converter. The step-up converter is electrically coupled to the power supply. The step-up converter is configured to increase a voltage of a power provided by the power supply. The step-down converter is electrically coupled to the step-up converter via a flexible transmission line. The step-down converter is configured to receive the power from the step-up converter, decrease the voltage of the power, and provide the power at the decreased voltage to a power rail assembly of the headset. The power rail assembly is electrically coupled to the step-down converter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A headset, such as an artificial reality headset, includes a power supply and a power rail assembly. The power rail assembly includes multiple components that consume power, such as display elements, depth sensing elements, and audio systems. Many components of the power rail assembly are configured to be positioned in front of the eyes of a user. The power supply may include a battery that supplies power to the power rail assembly. In order to balance the weight of the headset, it may be beneficial to separate the power supply from the power rail assembly. For example, the power rail assembly may be located in front of the eyes of the user, and the power supply may be located behind the head of the user. The power rail assembly includes multiple components that have high power demands (e.g., displays, eye-tracking units, structured light illuminators, cameras, etc.). With limited power provided by the power supply, reductions in power wastage improve the performance of the headset.

The power rail assembly and the power supply are electrically coupled by one or more transmission lines. As power is transmitted through the transmission lines from the power supply to the power rail assembly, a portion of the power is lost due to the impedance in the transmission lines. In general, it is beneficial for user comfort to have flexible transmission lines. However, smaller gauge transmission lines, which tend to be more flexible, also have higher impedance, and in turn result in higher power losses. The amount of power loss is proportional to the square of the current in the transmission lines.

Power management systems for headsets disclosed herein include a step-up converter and a step-down converter. The step-up converter increases the voltage and decreases the current supplied by the power supply. Power is transmitted via the transmission lines at the increased voltage. The step-down converter decreases the voltage to a suitable level for the various components of the power rail assembly. Power lost by the step-up converter and the step-down converter is more than compensated for by a decrease in power loss in the transmission lines due to the decreased current of the power transmitted via the transmission lines.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1:
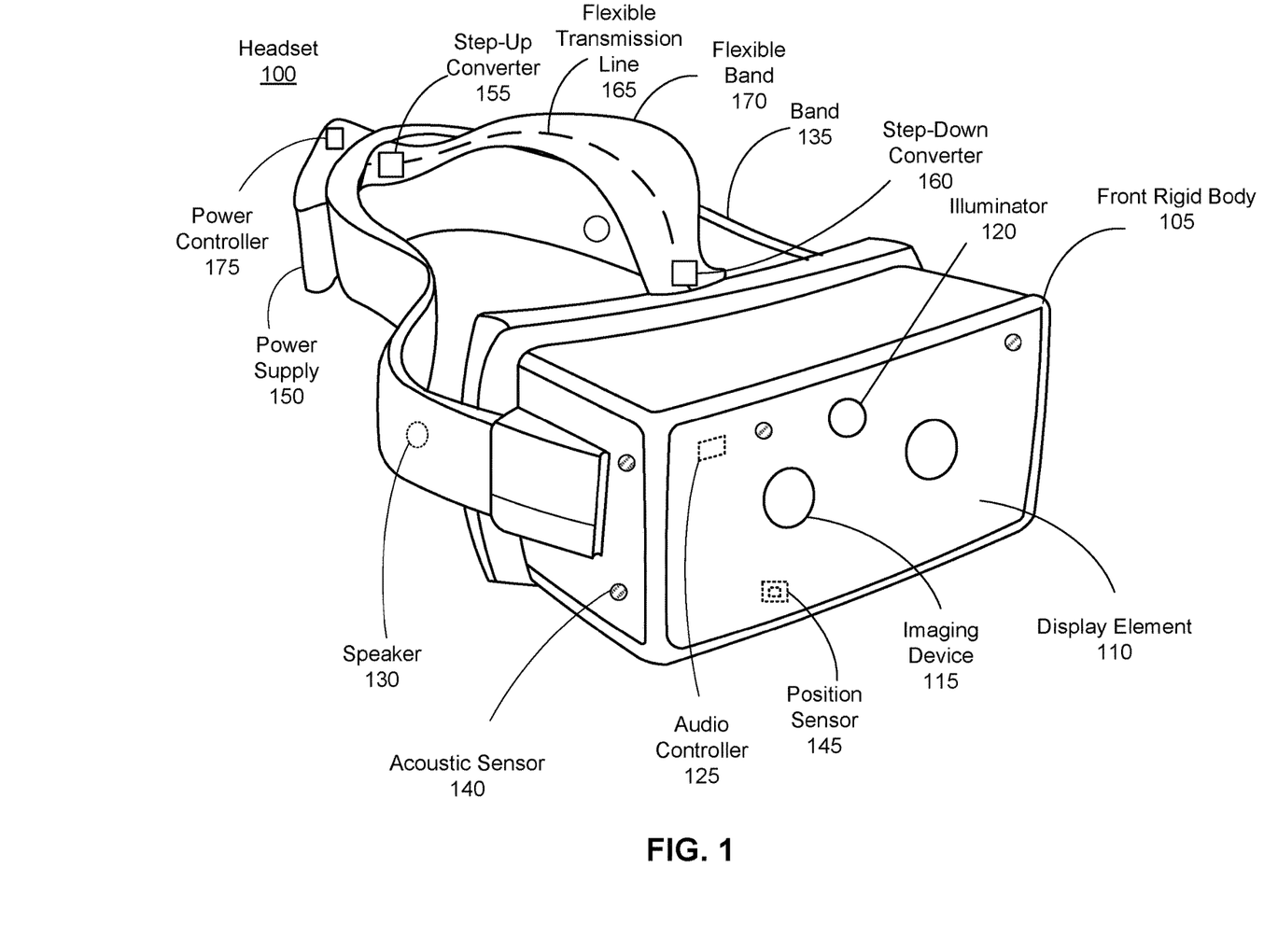
FIG. 1 is a perspective view of a headset implemented as an eyewear device, in accordance with one or more embodiments.

FIG. 1 is a perspective view of a headset 100 implemented as a head-mounted display (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 105 and a band 135. The front rigid body 105 includes a power rail assembly, as further described with reference to FIG. 2.

In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes, among other components, a display assembly including one or more display elements 110, a depth camera assembly (DCA), and an audio system. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1. The front rigid body 105 holds multiple components of the headset 100. The headset 100 includes the front rigid body 105 and bands 135 to attach to a head of the user.

The one or more display elements 110 provide light to a user wearing the headset 100. As illustrated the headset includes a display element 110 for each eye of a user. In some embodiments, a display element 110 generates image light that is provided to an eyebox of the headset 100. The eyebox is a location in space that an eye of user occupies while wearing the headset 100. For example, a display element 110 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 110 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 110 are at least partially transparent, such that light from the local area may be combined with light from the one or more display elements to produce AR and/or MR content.

In some embodiments, a display element 110 does not generate image light, and instead is a lens that transmits light from the local area to the eyebox. For example, one or both of the display elements 110 may be a lens without correction (non-prescription) or a prescription lens (e.g., single vision, bifocal and trifocal, or progressive) to help correct for defects in a user's eyesight. In some embodiments, the display element 110 may be polarized and/or tinted to protect the user's eyes from the sun.

In some embodiments, the display element 110 may include an additional optics block (not shown). The optics block may include one or more optical elements (e.g., lens, Fresnel lens, etc.) that direct light from the display element 110 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 115 and a DCA controller (not shown in FIG. 1), and may also include an illuminator 120. In some embodiments, the illuminator 120 illuminates a portion of the local area with light. The light may be, e.g., structured light (e.g., dot pattern, bars, etc.) in the infrared (IR), IR flash for time-of-flight, etc. In some embodiments, the one or more imaging devices 115 capture images of the portion of the local area that include the light from the illuminator 120. As illustrated, FIG. 1 shows a single illuminator 120 and one imaging device 115. In alternate embodiments, there is no illuminator 120 and at least two imaging devices 115.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 120), some other technique to determine depth of a scene, or some combination thereof.

The audio system provides audio content. The audio system includes a transducer array, a sensor array, and an audio controller 125. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 130 or a tissue transducer (e.g., a bone conduction transducer or a cartilage conduction transducer). If present, the tissue transducer couples to the head of the user and directly vibrates tissue (e.g., bone or cartilage) of the user to generate sound. The number and/or locations of transducers may be different from what is shown in FIG. 1.

The sensor array detects sounds within the local area of the headset 100. The sensor array includes a plurality of acoustic sensors 140. An acoustic sensor 140 captures sounds emitted from one or more sound sources in the local area (e.g., a room). Each acoustic sensor is configured to detect sound and convert the detected sound into an electronic format (analog or digital). The acoustic sensors 140 may be acoustic wave sensors, microphones, sound transducers, or similar sensors that are suitable for detecting sounds.

In some embodiments, one or more acoustic sensors 140 may be placed in an ear canal of each ear (e.g., acting as binaural microphones). In some embodiments, the acoustic sensors 140 may be placed on an exterior surface of the headset 100, placed on an interior surface of the headset 100, separate from the headset 100 (e.g., part of some other device), or some combination thereof. The number and/or locations of acoustic sensors 140 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 125 processes information from the sensor array that describes sounds detected by the sensor array. The audio controller 125 may comprise a processor and a computer-readable storage medium. The audio controller 125 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 130, or some combination thereof.

The position sensor 145 generates one or more measurement signals in response to motion of the headset 100. The position sensor 145 may be located on a portion of the front rigid body 105 of the headset 100. The position sensor 145 may include an inertial measurement unit (IMU). Examples of position sensor 145 include: one or more accelerometers, one or more gyroscopes, one or more magnetometers, another suitable type of sensor that detects motion, a type of sensor used for error correction of the IMU, or some combination thereof. The position sensor 145 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 115 of the DCA may also function as the PCA. The images captured by the PCA and the depth information determined by the DCA may be used to determine parameters of the local area, generate a model of the local area, update a model of the local area, or some combination thereof. Furthermore, the position sensor 145 tracks the position (e.g., location and pose) of the headset 100 within the room. Additional details regarding the components of the headset 100 are discussed below in connection with FIG. 4.

The headset 100 includes a power management system. The power management system includes a power supply 150. The power supply 150 is configured to provide power to the various components of the headset 100. The power supply 150 is electrically coupled to a step-up converter 155. The step-up converter is configured to increase a voltage and decrease a current of power provided by the power supply 150. The step-up converter 155 is coupled to a step-down converter 160 via a flexible transmission line 165. The flexible transmission line may be embedded within a flexible band 170 and may comprise at least one electrically conductive wires, such as a copper wire. The step-down converter 160 is configured to reduce the voltage and increase the current of the power received from the step-up converter. The step-down converter 160 provides the power to the various power-consuming components of the headset 100. By decreasing the current through the flexible transmission line 165, the power management system decreases power loss in the flexible transmission line 165.

The power management system includes a power controller 175. The power controller 175 detects the electrical conditions at various locations in the headset 100, such as the current, voltage, resistance, and power demands. The power controller 175 adjusts the amount of gain in the step-up converter 155 and/or the step-down converter 160 to control (e.g., decrease or minimize) the amount of power loss in the headset 100 for given load conditions.

Figure 2:
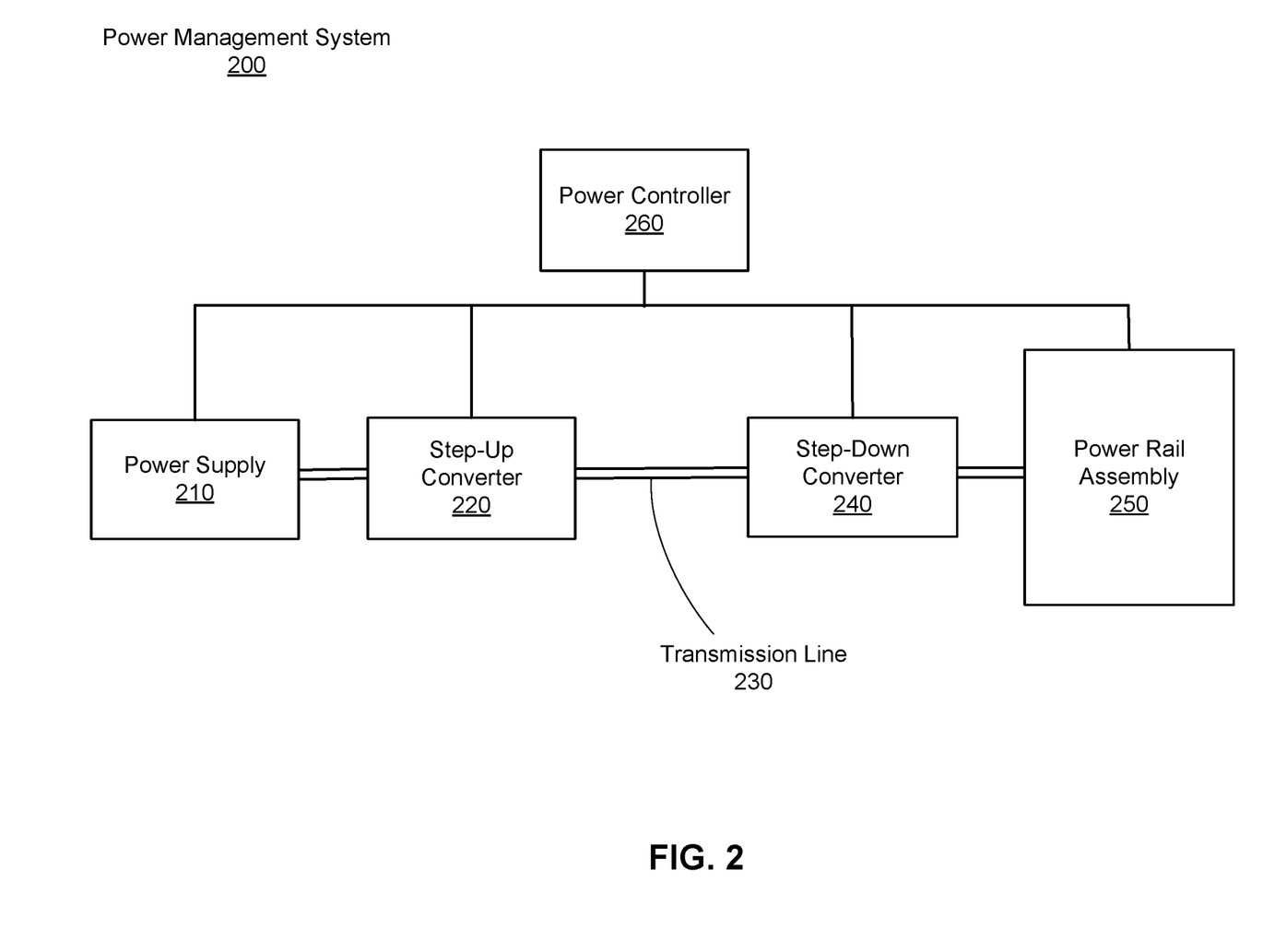
FIG. 2 is a block diagram of a power management system, in accordance with one or more embodiments.

FIG. 2 is a block diagram of a power management system 200, in accordance with one or more embodiments. The power management system 200 is configured to control the use of power in a device, such as the headset 100 of FIG. 1. The power management system 200 is further configured to decrease, and in some cases minimize, power loss during the transmission of power within the device. The power management system 200 may comprise a power supply 210, a step-up converter 220, a transmission line 230, a step-down converter 240, a power rail assembly 250, and a power controller 260.

The power supply 210 is configured to provide power to the power rail assembly 250. The power supply 150 of FIG. 1 may be an embodiment of the power supply 210. The power supply 210 may comprise a rechargeable battery, such as a lithium-ion battery. The power supply 210 may output a direct current (DC) power at a DC voltage. The output DC voltage is configured to produce a direct current. In one or more embodiments, the power supply 210 may be configured to receive non-rechargeable batteries. The power supply 210 is configured to connect to an external power source, such as a standard 110 V outlet or a computer, to recharge the power supply 210 and/or to provide power to the power rail assembly 250. In one or more embodiments, the power supply 210 may comprise a voltage differential of approximately 3.3V, between 2.5V-5.0V, or any other suitable voltage differential.

The step-up converter 220 is configured to increase a voltage of a power received from the power supply 210. The step-up converter 155 of FIG. 1 may be an embodiment of the step-up converter 220. The step-up converter 220 may be a DC-to-DC power converter that steps up voltage (while stepping down current) from the power supply 210 to the transmission line 230. The step-up converter 220 may be a class of switched-mode power supply (SMPS) containing at least two semiconductors (a diode and a transistor) and at least one energy storage element: a capacitor, inductor, or the two in combination. To reduce voltage ripple, filters made of capacitors (sometimes in combination with inductors) may be added to the step-up converter's output and input.

The step-up converter 220 adjusts the voltage of the power based on instructions received from the power controller 260. The step-up converter 220 may comprise a voltage limiter that limits the maximum voltage to 36 V or less to decrease any potential safety risks from high voltage. The step-up converter 220 is electrically coupled to the transmission line 230. The step-up converter 220 provides power to the transmission line 230 at the adjusted voltage. By increasing the voltage for a constant power, the step-up converter 220 decreases the current through the transmission line, and therefore decreases the amount of power lost during transmission.

The transmission line 230 is configured to transmit power from the step-up converter 220 to the step-down converter 240. The flexible transmission line 165 of FIG. 1 may be an embodiment of the transmission line 230. The transmission line 230 comprises an electrically conductive material, such as one or more copper wires. Each copper wire may comprise a single strand or multiple strands. The transmission line 230 may be flexible, such that the transmission line 230 may be bent to comfortably fit around the head of user. The transmission line 230 has an impedance. As power is transmitted through the transmission line 230, a portion of the power is lost. The lost power is proportional to the impedance of the transmission line 230. The impedance of the transmission line 230 may be decreased by increasing a diameter of the transmission line 230. However, increasing the diameter of the transmission line 230 decreases the flexibility of the transmission line and increases the weight of the transmission line 230.

The step-down converter 240 is configured to adjust a voltage of power received via the transmission line 230 and provide the power to the power rail assembly 250. The step-down converter 160 of FIG. 1 may be an embodiment of the step-down converter 240. The step-down converter 240 adjusts the voltage in accordance with instructions from the power controller 260, such as by decreasing the voltage. By decreasing the voltage for a constant power, the step-up converter 220 increases the current provided to the power rail assembly 250. In some cases, the step-down converter 240 is configured to transmit the power without changing the voltage.

The step-down converter 240 may be configured to decrease the voltage to multiple levels simultaneously. For example, different components of the power rail assembly 250 may operate at different voltage levels. Thus, the step-down converter 240 may output a first voltage of 20 V for a first component, and a second voltage of 4 V for a second component. The step-down converter 240 may output any suitable number and value of voltages for operation of multiple components in the power rail assembly 250. The step-down converter 240 may provide power to one or more components of the power rail assembly 250 without adjusting the voltage.

The power rail assembly 250 is configured to provide power to one or more components that consume power. For example, the power rail assembly 250 may comprise a display element, an acoustic sensor, a speaker, a controller, an imaging device, an illuminator, a position sensor, or any other suitable components. The power rail assembly 250 receives power from the step-down converter 240. Each component may have a different operating voltage. The power rail assembly 250 may receive the power from the step-down converter 240 at different voltages, such as at the operating voltage for each component. In some embodiments, one or more components of the power rail assembly 250 may include an additional step-up converter to increase the voltage received from the step-down converter 240 to an operating voltage for that component, or the step-up converter 220 may increase the voltage to the operating voltage, and the step-down converter 240 provides the power to the components at the operating voltage without adjusting the voltage. The power rail assembly 250 may comprise a high-power rail including one or more components that consume power at the voltage on the transmission line, such that the step-down converter 240 does not decrease the voltage, or the power supplied to the high-power rail bypasses the step-down converter.

The power controller 260 is configured to provide instructions to the step-up converter 220 and the step-down converter 240 to adjust the voltage of the power provided from the power supply 210 to the power rail assembly 250. The power controller 260 may monitor the performance of the components of the power management system 200. For example, the power controller 260 may detect the real-time power demands of the power rail assembly 250. The power controller 260 may detect the power demand of each component of the power rail assembly 250. In some embodiments, each component of the power rail assembly 250 may have a known power demand, and the power controller 260 may calculate the power demand for the power rail assembly 250 based on detecting which components are active. The power controller 260 may calculate and/or measure the current transmitted through the transmission line 230 (e.g., via one or more voltmeters, ammeters, watt meters, ohmmeters, etc.). The power controller 260 may measure or calculate the load on the power supply 210, the step-up converter 220, and the step-down converter 240.

The power controller 260 is configured to select a gain level for the step-up converter 220 and the step-down converter 240. The gain level is the ratio of the output voltage to the input voltage. The power wasted in the transmission line 230 is proportional to the square of the current. Thus, by increasing the voltage and decreasing the current, the amount of wasted power is greatly reduced. However, there is also a power loss associated with the step-up converter 220 and the step-down converter 240. In some embodiments, the step-up converter 220 and the step-down converter 240 may each have an efficiency of approximately 90%. The total power loss due to transmission from the power supply 210 to the power rail assembly 250 is defined as the sum of the power loss in the step-up converter 220, the power loss in the transmission line 230, and the power loss in the step-down converter 240. The power controller 260 may select a gain level that minimizes the total power loss. However, the power controller 260 may follow a safety limit that limits the gain such that the voltage does not exceed a maximum value, such as 36 V.

The power controller 260 may adjust the gain level at various time intervals. In some embodiments, the power controller 260 may adjust the gain level periodically, such as once per second or once per minute. In some embodiments, the power controller 260 may adjust the gain level dynamically based in part on current and/or predicted load conditions. For example, the power controller 260 may adjust the gain level in response to an event, such as in response to a change in power demand from the power rail assembly 250 (e.g., in response to activation of a component of the power rail assembly 250). The power controller 260 may predict that, in response to a component of the power rail assembly 250 being activated (or deactivated), the load will increase (or decrease) within the device, and the power controller 260 may adjust the gain accordingly. And sometimes, such as in response to a low power demand from the power rail assembly 250, the gain level may be equal to 1.0, such that the step-up converter 220 and/or the step-down converter 240 do not adjust the voltage.

Figure 3:
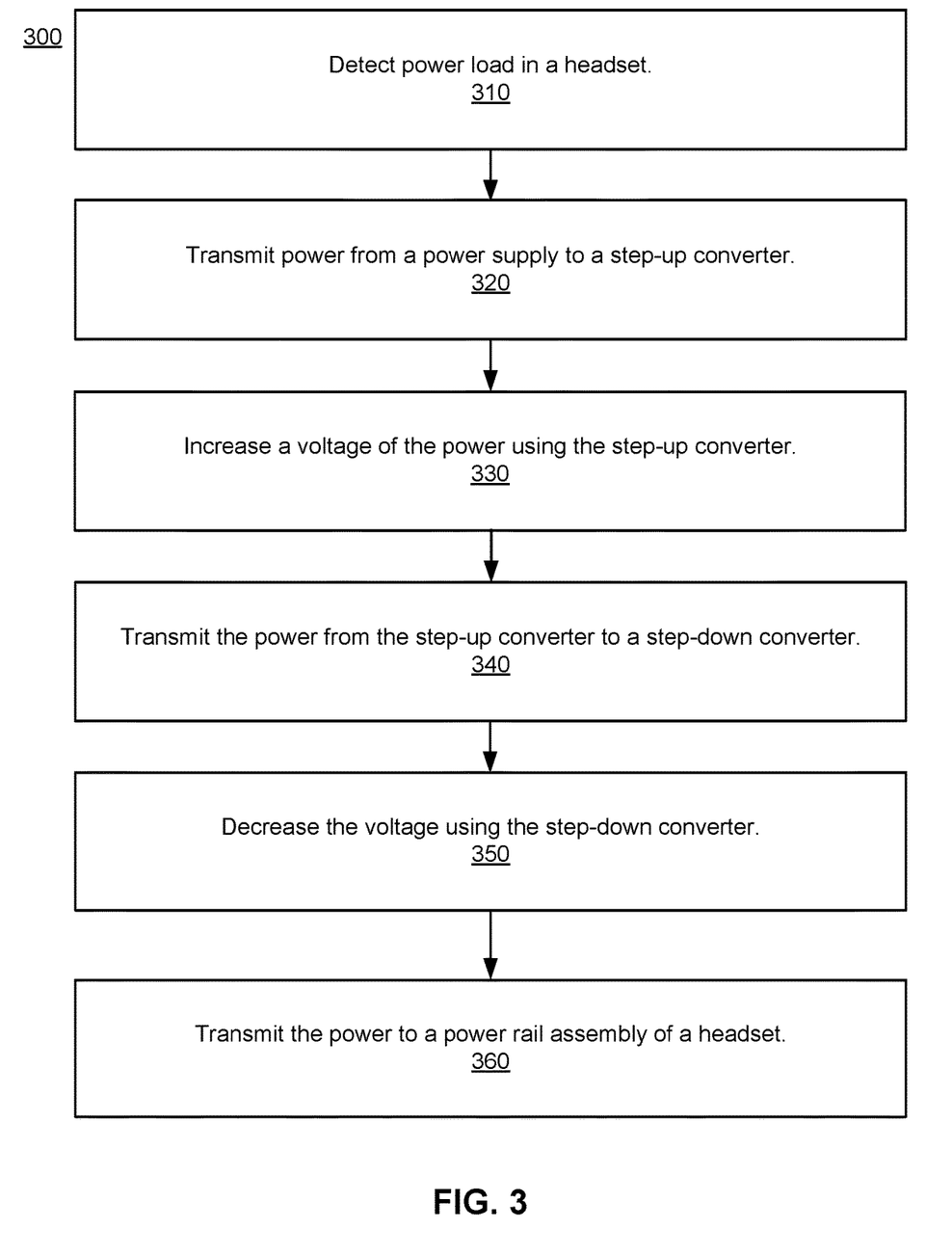
FIG. 3 is a flowchart illustrating a process for reducing power wastage, in accordance with one or more embodiments.

FIG. 3 is a flowchart of a method of decreasing power wastage 300, in accordance with one or more embodiments. The process shown in FIG. 3 may be performed by components of a power management system (e.g., the power management system 200). Other entities may perform some or all of the steps in FIG. 3 in other embodiments. Embodiments may include different and/or additional steps, or perform the steps in different orders.

The power management system detects 310 a power load in a headset. A power controller may measure the power load at any suitable location in the headset, or the power controller may calculate the power load based on which components are active on the headset and the functions being performed by the components. The power controller may dynamically provide instruction to a step-up converter and/or a step-down converter based on the detected power load.

The power management system transmits 320 power from a power supply to the step-up converter.

The step-up converter increases 330 a voltage and decreases a current of the power received from the power supply. The step-up converter may increase the voltage based on instructions received from a power controller.

The step-up converter transmits 340 the power to a step-down converter via a transmission line. The power lost during transmission is decreased due to the decreased current.

The step-down converter decreases 350 the voltage and increases the current. The step-down converter may decrease the voltage to multiple different voltages to meet different power demands from different components in a power rail assembly of the headset. The step-down converter transmits 360 to the power rail assembly. The various components of the power rail assembly using the power provided by the step-down converter.

Figure 4:
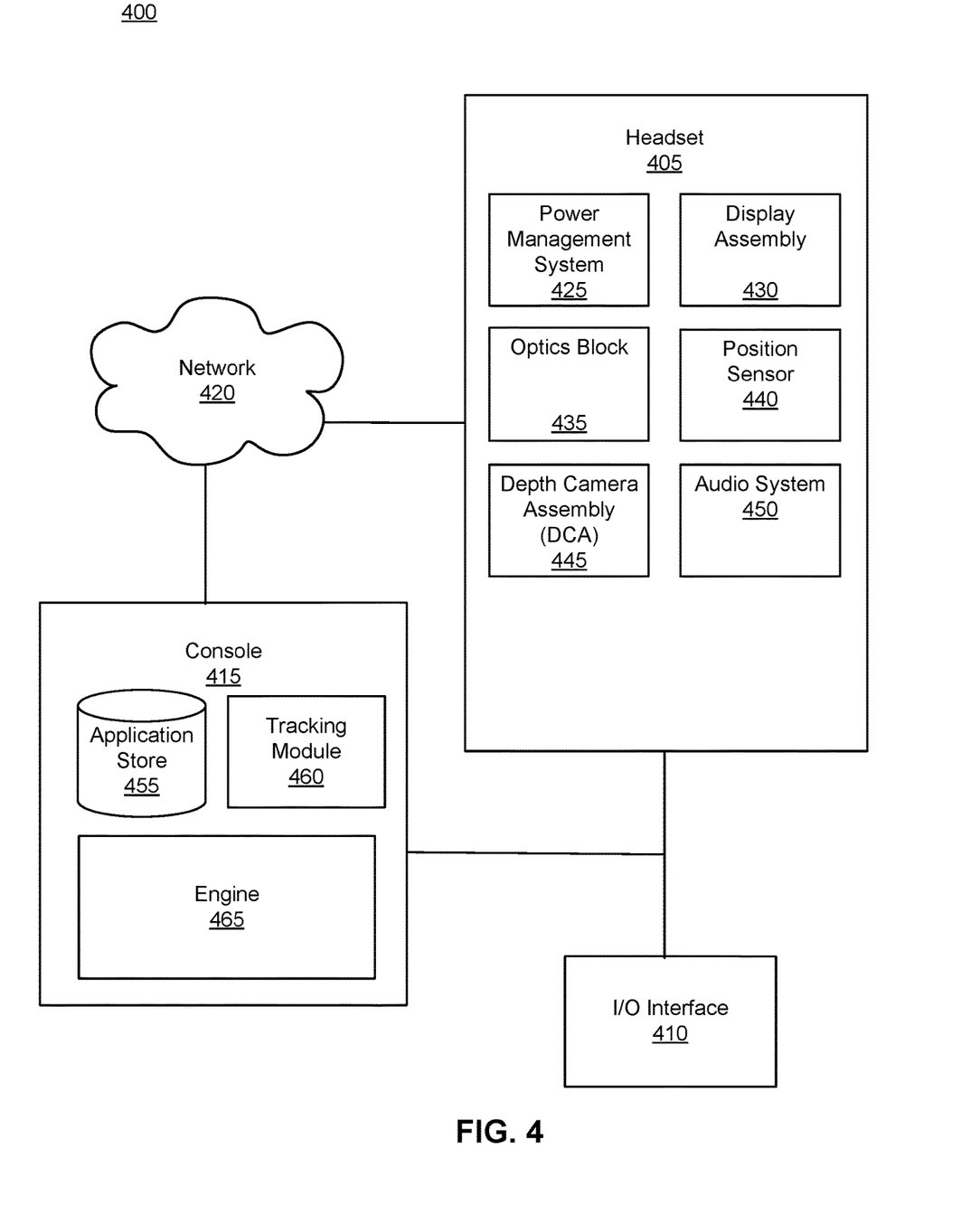
FIG. 4 is a system that includes a headset, in accordance with one or more embodiments.

FIG. 4 is a system 400 that includes a headset 405, in accordance with one or more embodiments. In some embodiments, the headset 405 may be the headset 100 of FIG. 1. The system 400 may operate in an artificial reality environment (e.g., a virtual reality environment, an augmented reality environment, a mixed reality environment, or some combination thereof). The system 400 shown by FIG. 4 includes the headset 405 including a power management system 425, an input/output (I/O) interface 410 that is coupled to a console 415, and the network 420. While FIG. 4 shows an example system 400 including one headset 405 and one I/O interface 410, in other embodiments any number of these components may be included in the system 400. For example, there may be multiple headsets each having an associated I/O interface 410, with each headset and I/O interface 410 communicating with the console 415. In alternative configurations, different and/or additional components may be included in the system 400. Additionally, functionality described in conjunction with one or more of the components shown in FIG. 4 may be distributed among the components in a different manner than described in conjunction with FIG. 4 in some embodiments. For example, some or all of the functionality of the console 415 may be provided by the headset 405.

The headset 405 includes the power management system 425, the display assembly 430, an optics block 435, one or more position sensors 440, the DCA 445, and the audio system 450. Some embodiments of headset 405 have different components than those described in conjunction with FIG. 4. Additionally, the functionality provided by various components described in conjunction with FIG. 4 may be differently distributed among the components of the headset 405 in other embodiments, or be captured in separate assemblies remote from the headset 405.

The power management system is configured to decrease power loss in the headset 405. The power management system 425 may be an embodiment of the power management system 200 of FIG. 2. The power management system 425 includes a power supply, a step-up converter and a step-down converter. The step-up converter increases the voltage and decreases the current supplied by the power supply. The power is transmitted via transmission lines at the increased voltage. The step-down converter decreases the voltage to a suitable level for various components of a power rail assembly of the headset 405, such as the display assembly 430, the position sensor 440, the DCA 445, and the audio system 450. The power saved by transmission at a lower current in the transmission lines is greater than the power lost by the step-up converter and the step-down converter.

The display assembly 430 displays content to the user in accordance with data received from the console 415. The display assembly 430 displays the content using one or more display elements (e.g., the display elements 110). A display element may be, e.g., an electronic display. In various embodiments, the display assembly 430 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 110 may also include some or all of the functionality of the optics block 435.

The optics block 435 may magnify image light received from the electronic display, corrects optical errors associated with the image light, and presents the corrected image light to one or both eyeboxes of the headset 405. In various embodiments, the optics block 435 includes one or more optical elements. Example optical elements included in the optics block 435 include: an aperture, a Fresnel lens, a convex lens, a concave lens, a filter, a reflecting surface, or any other suitable optical element that affects image light. Moreover, the optics block 435 may include combinations of different optical elements. In some embodiments, one or more of the optical elements in the optics block 435 may have one or more coatings, such as partially reflective or anti-reflective coatings.

Magnification and focusing of the image light by the optics block 435 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 435 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 435 corrects the distortion when it receives image light from the electronic display generated based on the content.

The position sensor 440 is an electronic device that generates data indicating a position of the headset 405. The position sensor 440 generates one or more measurement signals in response to motion of the headset 405. The position sensor 145 is an embodiment of the position sensor 440. Examples of a position sensor 440 include: one or more IMUS, one or more accelerometers, one or more gyroscopes, one or more magnetometers, another suitable type of sensor that detects motion, or some combination thereof. The position sensor 440 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 405 from the sampled data. For example, the IMU integrates the measurement signals received from the accelerometers over time to estimate a velocity vector and integrates the velocity vector over time to determine an estimated position of a reference point on the headset 405. The reference point is a point that may be used to describe the position of the headset 405. While the reference point may generally be defined as a point in space, however, in practice the reference point is defined as a point within the headset 405.

The DCA 445 generates depth information for a portion of the local area. The DCA includes one or more imaging devices and a DCA controller. The DCA 445 may also include an illuminator. Operation and structure of the DCA 445 is described above with regard to FIG. 1.

The audio system 450 provides audio content to a user of the headset 405. The audio system 450 may comprise one or acoustic sensors, one or more transducers, and an audio controller. The audio system 450 may provide spatialized audio content to the user.

The I/O interface 410 is a device that allows a user to send action requests and receive responses from the console 415. An action request is a request to perform a particular action. For example, an action request may be an instruction to start or end capture of image or video data, or an instruction to perform a particular action within an application. The I/O interface 410 may include one or more input devices. Example input devices include: a keyboard, a mouse, a game controller, or any other suitable device for receiving action requests and communicating the action requests to the console 415. An action request received by the I/O interface 410 is communicated to the console 415, which performs an action corresponding to the action request. In some embodiments, the I/O interface 410 includes an IMU that captures calibration data indicating an estimated position of the I/O interface 410 relative to an initial position of the I/O interface 410. In some embodiments, the I/O interface 410 may provide haptic feedback to the user in accordance with instructions received from the console 415. For example, haptic feedback is provided when an action request is received, or the console 415 communicates instructions to the I/O interface 410 causing the I/O interface 410 to generate haptic feedback when the console 415 performs an action.

The console 415 provides content to the headset 405 for processing in accordance with information received from one or more of: the DCA 445, the headset 405, and the I/O interface 410. In the example shown in FIG. 4, the console 415 includes an application store 455, a tracking module 460, and an engine 465. Some embodiments of the console 415 have different modules or components than those described in conjunction with FIG. 4. Similarly, the functions further described below may be distributed among components of the console 415 in a different manner than described in conjunction with FIG. 4. In some embodiments, the functionality discussed herein with respect to the console 415 may be implemented in the headset 405, or a remote system.

The application store 455 stores one or more applications for execution by the console 415. An application is a group of instructions, that when executed by a processor, generates content for presentation to the user. Content generated by an application may be in response to inputs received from the user via movement of the headset 405 or the I/O interface 410. Examples of applications include: gaming applications, conferencing applications, video playback applications, or other suitable applications.

The tracking module 460 tracks movements of the headset 405 or of the I/O interface 410 using information from the DCA 445, the one or more position sensors 440, or some combination thereof. For example, the tracking module 460 determines a position of a reference point of the headset 405 in a mapping of a local area based on information from the headset 405. The tracking module 460 may also determine positions of an object or virtual object. Additionally, in some embodiments, the tracking module 460 may use portions of data indicating a position of the headset 405 from the position sensor 440 as well as representations of the local area from the DCA 445 to predict a future location of the headset 405. The tracking module 460 provides the estimated or predicted future position of the headset 405 or the I/O interface 410 to the engine 465.

The engine 465 executes applications and receives position information, acceleration information, velocity information, predicted future positions, or some combination thereof, of the headset 405 from the tracking module 460. Based on the received information, the engine 465 determines content to provide to the headset 405 for presentation to the user. For example, if the received information indicates that the user has looked to the left, the engine 465 generates content for the headset 405 that mirrors the user's movement in a virtual local area or in a local area augmenting the local area with additional content. Additionally, the engine 465 performs an action within an application executing on the console 415 in response to an action request received from the I/O interface 410 and provides feedback to the user that the action was performed. The provided feedback may be visual or audible feedback via the headset 405 or haptic feedback via the I/O interface 410.

The network 420 couples the headset 405 and/or the console 415 to external systems. The network 420 may include any combination of local area and/or wide area networks using both wireless and/or wired communication systems. For example, the network 420 may include the Internet, as well as mobile telephone networks. In one embodiment, the network 420 uses standard communications technologies and/or protocols. Hence, the network 420 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 420 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 420 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 400 may contain a privacy module that stores one or more privacy settings for user data elements. The user data elements describe the user or the headset 405. For example, the user data elements may describe a physical characteristic of the user, an action performed by the user, a location of the user of the headset 405, a location of the headset 405, an HRTF for the user, etc. Privacy settings (or "access settings") for a user data element may be stored in any suitable manner, such as, for example, in association with the user data element, in an index on an authorization server, in another suitable manner, or any suitable combination thereof. A privacy setting for a user data element specifies how the user data element (or particular information associated with the user data element) can be accessed, stored, or otherwise used (e.g., viewed, shared, modified, copied, executed, surfaced, or identified).

The system 400 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A power system comprising:
   a power supply configured to output a direct current (DC) power at a first DC voltage, the power supply located at a first portion of a headset;
   a flexible transmission line;
   a step-up converter electrically coupled to the power supply and the flexible transmission line, the step-up converter configured to increase the first DC voltage to a second DC voltage; and
   a step-down converter located at a second portion of the headset and electrically coupled to the step-up converter via the flexible transmission line, the step-down converter configured to:
   receive, directly from the step-up converter via the flexible transmission line, the DC power at the second DC voltage, and
   reduce the second DC voltage to a third DC voltage, at least a portion of the third DC voltage provided to an electrical load of the headset.

2. The power system of claim 1, further comprising a high-power rail configured to receive the DC power at the second DC voltage.

3. The power system of claim 1, further comprising a power controller configured to detect the electrical load.

4. The power system of claim 3, wherein the power controller is configured to adjust a gain of the step-up converter based on the electrical load.

5. The power system of claim 3, wherein the power controller is configured to measure the electrical load.

6. The power system of claim 3, wherein the power controller is configured to calculate the electrical load.

7. A headset comprising:
a power supply configured to output a direct current (DC) power at a first DC voltage;
a flexible transmission line;
a step-up converter electrically coupled to the power supply and the flexible transmission line;
a step-down converter electrically coupled to the step-up converter via the flexible transmission line, the step-down converter configured to receive, directly from the step-up converter via the flexible transmission line, the DC power at a second DC voltage; and
a power rail assembly electrically coupled to the step-down converter.

8. The headset of claim 7, wherein the step-up converter is configured to increase a voltage of the DC power provided by the power supply from the first DC voltage to the second DC voltage.

9. The headset of claim 8, wherein the step-down converter is further configured to decrease the second DC voltage to a third DC voltage.

10. The headset of claim 8, wherein the step-down converter is further configured to decrease the second DC voltage to a plurality of voltages.

11. The headset of claim 7, further comprising a power controller configured to detect an electrical load in the headset.

12. The headset of claim 11, wherein the power controller is configured to adjust a gain of the step-up converter based on the electrical load.

13. The headset of claim 11, further comprising a high-power rail configured to receive the DC power at the second DC voltage via the flexible transmission line.

14. A headset comprising:
a power supply configured to output a direct current (DC) power at a first DC voltage;
a flexible transmission line;
a step-up converter configured to increase the first DC voltage of the DC power provided by the power supply; and
a step-down converter configured to:
receive the DC power directly from the step-up converter via the flexible transmission line,
decrease a DC voltage of the received DC power, and
provide the DC power at the decreased voltage to a power rail assembly of the headset.

15. The headset of claim 14, further comprising a power controller configured to adjust a gain of the step-up converter.

16. The headset of claim 15, wherein the power controller is configured to adjust the gain based on an electrical load in the headset.

17. The headset of claim 14, wherein the power rail assembly is configured to be located in front of eyes of a user of the headset, and wherein the power supply is configured to be located behind a head of the user.

18. The headset of claim 14, further comprising a high-power rail configured to receive the DC power at a second DC voltage output by the step-up converter.

* * * * *